US012304353B2

(12) United States Patent
Huang et al.

(10) Patent No.: US 12,304,353 B2
(45) Date of Patent: May 20, 2025

(54) THERMAL ARCHITECTURE FOR PROVIDING COOLING IN ELECTRIC VEHICLES

(71) Applicant: Rivian IP Holdings, LLC, Irvine, CA (US)

(72) Inventors: Henry Huang, Ann Arbor, MI (US); Mayur Prakash Gaikwad, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 282 days.

(21) Appl. No.: 17/850,217

(22) Filed: Jun. 27, 2022

(65) Prior Publication Data
US 2023/0034110 A1 Feb. 2, 2023

Related U.S. Application Data

(60) Provisional application No. 63/226,716, filed on Jul. 28, 2021.

(51) Int. Cl.
*B60H 1/00* (2006.01)
*B60L 58/26* (2019.01)
*B60L 58/27* (2019.01)

(52) U.S. Cl.
CPC .......... *B60L 58/26* (2019.02); *B60H 1/00278* (2013.01); *B60H 1/00885* (2013.01); *B60L 58/27* (2019.02); *B60L 2240/545* (2013.01)

(58) Field of Classification Search
CPC ............ B60H 1/00278; B60H 1/00885; B60H 2001/00307; B60L 58/26; B60L 58/27; B60L 2240/545
See application file for complete search history.

(56) References Cited

U.S. PATENT DOCUMENTS

2013/0175022 A1\* 7/2013 King ...................... B60L 50/62
237/12.3 B
2018/0086224 A1 3/2018 King \* cited by examiner

*Primary Examiner* — Jonathan Bradford
(74) *Attorney, Agent, or Firm* — Haley Guiliano LLP

(57) ABSTRACT

A thermal architecture of an electric vehicle includes a drivetrain system having a drivetrain, a cabin air system for providing conditioned air to an occupant compartment, a battery system having cooling components, and a refrigeration system for providing cooling to the cabin air system and the battery system. Control circuitry is configured to manage cooling or heating of components of the thermal architecture. For example, the control circuitry selects from among a mode for cooling a battery system and another mode for heating the battery system. In the heating mode, the control circuitry causes heat to be generated by the drive system, which may include one or more electric motors, and transferred to the battery system. The control circuitry receives a plurality of sensor signals from a sensor interface, generates one or more control signals, and cause valves and other components to achieve one or more cooling modes.

17 Claims, 7 Drawing Sheets

THERMAL ARCHITECTURE FOR PROVIDING COOLING IN ELECTRIC VEHICLES

REFERENCE TO CROSS-RELATED APPLICATIONS

This application claims the benefit of U.S. Provisional Patent Application No. 63/226,716 filed Jul. 28, 2021, the disclosure of which is hereby incorporated by reference herein in its entirety.

INTRODUCTION

The present disclosure is directed to a thermal architecture for an electric vehicle, and more particularly to improved efficiency of the thermal architecture using sensors, valves, and other components.

SUMMARY

In some embodiments, the present disclosure is directed to methods and systems for heating and cooling components of an electric vehicle. In some embodiments, a drive system may include one or more motors configured to generate torque (e.g., to drive one or more wheels) and to generate heat (e.g., based on current flow in the motor). In some embodiments, the drive system includes a plurality of motors, some or all of which may generate heat that may be used to heat a battery system (e.g., a heating configuration). The plurality of motors may also be cooled by a radiator (e.g., a cooling configuration).

In some embodiments, the present disclosure is directed to a system including a sensor interface, and output interface, and control circuitry. The sensor interface is configured to generate a plurality of sensor signals, which include at least one sensor signal corresponding to a temperature such as a fluid temperature or component temperature. The output interface is configured to transmit at least one control signal (e.g., a plurality of control signals). The control circuitry is coupled to the sensor interface and to the output interface, and is configured to receive the plurality of sensor signals from the sensor interface, cause heat to be generated by a drive system, and cause the output interface to generate a control signal for controlling a valve configured to direct flow of a fluid (e.g., coolant) from the drive system and to a battery system. In some embodiments, the control circuitry is configured to generate the control signal based on the temperature. In some embodiments, the heat is transferred to the battery system. For example, the heat is transferred from the fluid to the battery system by convection and/or conduction as the fluid flows past the battery system (e.g., from the drive system).

In some embodiments, the control circuitry is configured to determine whether to heat or cool the battery system. In some embodiments, the control circuitry is configured to select from among a first mode and a second mode. In some such embodiments, the first mode corresponds to heating the battery system by transferring heat from the fluid to the battery system, and the second mode corresponds to cooling the battery system. In response to selecting the first mode, the control circuitry is configured to cause the heat to be generated in a drive system by applying excess current to phases of at least one electric motor of the drive system.

In some embodiments, the temperature is indicative of an inlet temperature of a radiator such as an inlet temperature of the fluid, a surface temperature of the radiator, or any other suitable temperature. In some embodiments, the control circuitry is configured to determine a total heat based on the temperature and control the radiator to maintain a fluid temperature of the fluid in a desired range based on the total heat. In some embodiments, the control circuitry determines a value indicative of total heat, desired heat transfer, actual heat transfer, estimated heat transfer, temperature difference or gradient, any other suitable value indicative of heat transfer, or any combination thereof.

In some embodiments, the valve is or otherwise includes a three-way valve having an inlet corresponding to an outlet of a chiller interfaced to the battery system and alternate outlets corresponding to (i) a de-gas unit and (ii) an inlet of a pump of the battery system.

In some embodiments, the system includes a check valve arranged between a de-gas unit and the battery system, and the check valve is configured to limit flow of the fluid in one direction to the battery system from a de-gas unit.

In some embodiments, the system includes a radiator configured to cool the drive system, and a chiller coupled to a refrigeration system configured to cool a cabin. For example, in some embodiments, the control circuitry is configured to cause the heat to be generated by the drive system in a first configuration, and in a second configuration, the drive system is independently cooled by the radiator while the battery system is cooled by the chiller.

In some embodiments, the present disclosure is directed to a method for thermally managing vehicle systems. The method includes selecting a mode that corresponds to heating the battery system. In response to selecting a mode corresponding to heating a battery system, causing the drive system to generate heat, which is transferred to the battery system via flow of a fluid. The method also includes controlling at least one control valve to distribute a fluid flow to the battery system and a drive system.

In some embodiments, the method includes managing both heating and cooling of the battery system. In some embodiments, the method includes selecting from among a first mode and a second mode, wherein the first mode corresponds to heating a battery system, and wherein the second mode corresponds to cooling the battery system. In some embodiments, the method includes generating at least one control signal for controlling at least one control valve. In the second mode, the at least one control valve directs the fluid flow to the drive system, and isolates the battery system from the drive system.

In some embodiments, the method includes generating the heat by applying excess current to at least one electric motor of a plurality of electric motors of the drive system. For example, each of the plurality of electric motors drives, or otherwise corresponds to, a respective wheel of the drive system. For example, the drive system removes heat from the power electronics, the at least one electric motor, and/or other components of the drive system, and provides the heat to the battery system in the first mode.

In some embodiments, in the second mode corresponding to cooling, the fluid flow is directed from a de-gas unit to a pump, from the pump to the drive system, from the drive system to a radiator, and from the radiator to back to the de-gas unit. For example, the drive system and the battery system are isolated in the second mode such that the fluid does flow among both. In some embodiments, in the first mode corresponding to heating, the fluid flow is directed from the de-gas unit to a first path corresponding to the battery system and to a second path corresponding to the drive system and the radiator. In some such embodiments, the first path and the second path join before the inlet of the de-gas unit.

In some embodiments, in the second mode, the drive system is independently cooled via a radiator while the battery system is cooled via a chiller coupled to a refrigeration system that is also capable of cooling the cabin. In some embodiments, the method includes receiving a plurality of sensor signals from sensors positioned for capturing a temperature such as a maximum temperature before cooling with a radiator, determining a total heat based on the temperature, and controlling the radiator to maintain a coolant temperature in a desired range based on the total heat. For example, in some embodiments, the method includes controlling a shutter, flow to or from the radiator, or a combination thereof to maintain the coolant temperature in the desired range.

In some embodiments, in response to selecting the second mode, the method includes generating at least one control signal for controlling the at least one control valve to direct the fluid from a de-gas unit to a pump, from the pump to the drive system, from the drive system to a radiator, and from the radiator back to the de-gas unit. In some such embodiments, the method also includes cooling the drive system using a radiator, and cooling the battery system using a chiller coupled to a refrigeration system that is also capable of cooling the cabin. In some embodiments, in the second mode, the drive system is independently cooled via a radiator while the battery system is cooled via a chiller coupled to a refrigeration system that is also capable of cooling the cabin.

In some embodiments, the at least one control valve includes a multi-way valve (e.g., two, three, four, five, six-way valve, among others contemplated herein) having an inlet corresponding to an outlet of a chiller interfaced to the battery system and alternate outlets corresponding to (i) a de-gas unit and (ii) an inlet of a pump of the battery system.

In some embodiments, the method includes limiting the flow of the fluid in one direction to the battery system from the de-gas unit using a check valve arranged between a de-gas unit and the battery system. In some embodiments, the method includes controlling a shutter configured to direct airflow through a radiator arranged downstream of the drive system.

In some embodiments, the present disclosure is directed to a system that includes a drivetrain having at least one electric motor, a battery system, and control circuitry. The control circuitry determines a selection to heat the battery system, and in response to the selection, causes the drive system to generate heat. Also, in response to the selection, the system generates at least one control signal for controlling at least one control valve to cause a fluid to transfer the heat to the battery system from the drive system. In some embodiments, the mode is selected among a first mode for heating the battery system and a second mode for cooling the battery system. In some embodiments, in response to selecting the second mode for cooling, the control circuitry generates at least one control signal for controlling the at least one control valve to direct the fluid to flow to the drive system, and isolate the battery system from the drive system. In some embodiments, the control circuitry is further configured to generate the heat in the first mode by applying excess current to at least one electric motor of a plurality of electric motors of the drive system. Each electric motor may correspond to one or more wheels of the vehicle.

In some embodiments, the at least one control valve includes a multi-way valve (e.g., two, three, four, five, six-way valve, among others contemplated herein) having an inlet corresponding to an outlet of a chiller interfaced to the battery system and alternate outlets corresponding to (i) a de-gas unit and (ii) an inlet of a pump of the battery system. In some embodiments, the system includes a check valve arranged between a de-gas unit and the battery system configured to limit a flow of the fluid in one direction to the battery system from the de-gas unit.

In some embodiments, the system includes a shutter configured to direct airflow through a radiator arranged downstream of the drive system, and the control circuitry is configured to control the shutter (e.g., opening and closing the shutter).

In some embodiments, in the second mode for cooling, the fluid flow is directed from a de-gas unit to a pump, from the pump to the drive system, from the drive system to a radiator, and from the radiator to back to the de-gas unit. In some embodiments, in the first mode corresponding to heating, the fluid flow is directed from the de-gas unit to a first path corresponding to the battery system and to a second path corresponding to the drive system and the radiator. In some embodiments, in the first mode, the first path and the second path join before the inlet of the de-gas unit.

In some embodiments, the system includes a cabin air system for providing conditioned air to an occupant compartment, and a refrigeration system configured to provide cooling to the cabin air system and to the battery system. In some such embodiments, in the second mode, the drive system is independently cooled via a radiator while the battery system is cooled via a chiller coupled to the refrigeration system.

In some embodiments, the control circuitry is configured to receive a plurality of sensor signals from sensors positioned for capturing a maximum temperature before cooling with a radiator, determine a total heat based on the maximum temperature, and control the radiator to maintain a coolant temperature in a desired range based on the total heat.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

An electric vehicle may include subsystems that require cooling, heating, or both. In some embodiments, the present disclosure is directed to systems and methods for thermal management of cooling, heating, or both of subsystems of an electric vehicle. For example, e machines (e.g., electric motors) may be used for heating a battery pack by (strategically) internally short e machine drive motors to generate heat. This approach avoids the need for a coolant heater, allowing the advantage of using heating of e machines in the powertrain system to provide heating power to the battery system. For example, coolant is provided to the battery pack without having to use a heater (e.g., a positive temperature coefficient (PTC) heater).

Figure 1:
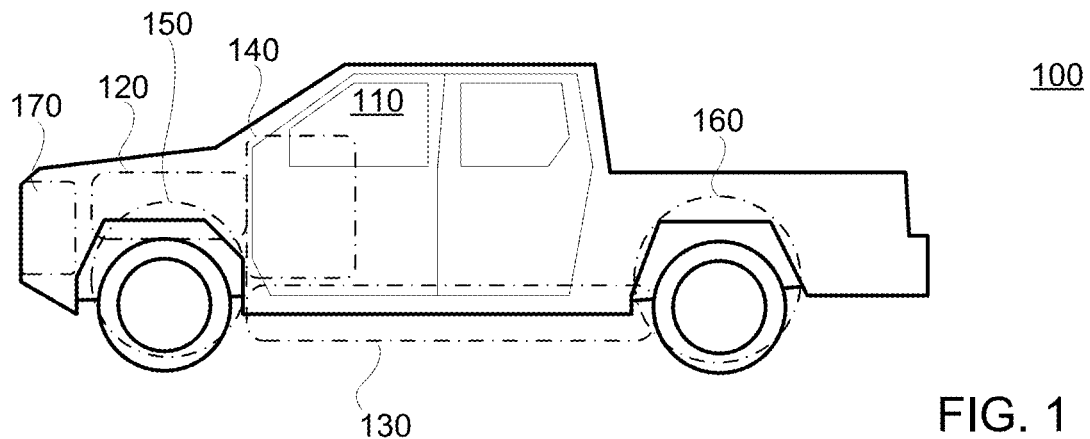
FIG. 1 shows a block diagram of an illustrative vehicle having cooling and heating loads, in accordance with some embodiments of the present disclosure.

FIG. 1 shows a block diagram of illustrative vehicle 100 having cooling and heating loads, in accordance with some embodiments of the present disclosure. As illustrated, vehicle 100 includes control system 120, battery system 130, cabin air system 140 for cooling cabin 110, drive unit 150, drive unit 160, and other loads 170, in accordance with some embodiments of the present disclosure. Control system 120 includes control circuitry that is coupled to a cooling system. In some embodiments, control system 120 includes the cooling system. For example, the cooling system may include a thermal refrigeration system that includes a compressor, a condenser, valving (e.g., controllable and/or fixed) and one or more evaporator units or otherwise heat exchangers, with a working fluid (e.g., any suitable refrigerant, coolant, or other fluid) for achieving a cooling process (e.g., a refrigeration cycle). Control system 120 may include control circuitry for monitoring sensor signals, generating control signals, executing computer readable instructions, receiving inputs, or a combination thereof. Battery system 130 may include a plurality of battery cells (e.g., arranged in one or more modules), enclosures, power electronics (e.g., a DC-DC converter, switches), and a battery cooling system having a liquid coolant or air that receives heat from the battery cells. The battery cooling system may include a pump or compressor, a radiator, a heat exchanger, a manifold, piping, hosing, tubing, fittings, control valving, sensors and other instrumentation, controllers, or any suitable combination thereof. Cabin air system 140 is configured to provide conditioned air to cabin 110 (e.g., an occupant compartment or zones thereof). For example, cabin air system 140 may be configured to provide cabin cooling (e.g., air conditioning), heating, defrosting, venting, or a suitable combination thereof. Cabin air system 140 may include a blower fan, ducting, plenums, dampers or diversion valves, filters, intakes, one or more input interfaces (e.g., knobs, hard buttons, soft buttons, touchscreen interfaces, voice interfaces), a controller, any other suitable components, or any combination thereof. Drive units 150 and 160 may each include motors, gearing, bearings, gearbox housings, cooling jackets, power electronics (e.g., a DC-AC converter, inverter, switches, or other components), any other suitable components, or any combination thereof. For example, each of drive units 150 and 160 may include an inverter, electric motor, and a gearbox for providing torque to a respective wheel or drive axis of the electric vehicle. Other loads 170 may include control modules, processors, electronics, mechanical components having cooling jackets or passages, any other suitable components that generate or otherwise transfer heat to the cooling system, or any combination thereof. It will be understood that a "working fluid" refers to a fluid in the context of a system, component, cycle, fluid path (e.g., a trajectory of a fluid as it flows among components and systems), and a "fluid" may include any suitable gas or vapor (e.g., air, water vapor, refrigerant vapor), liquid (e.g., water, coolant, refrigerant), mixture (e.g., single phase or multiphase), slurry, or combination thereof.

Figure 2:
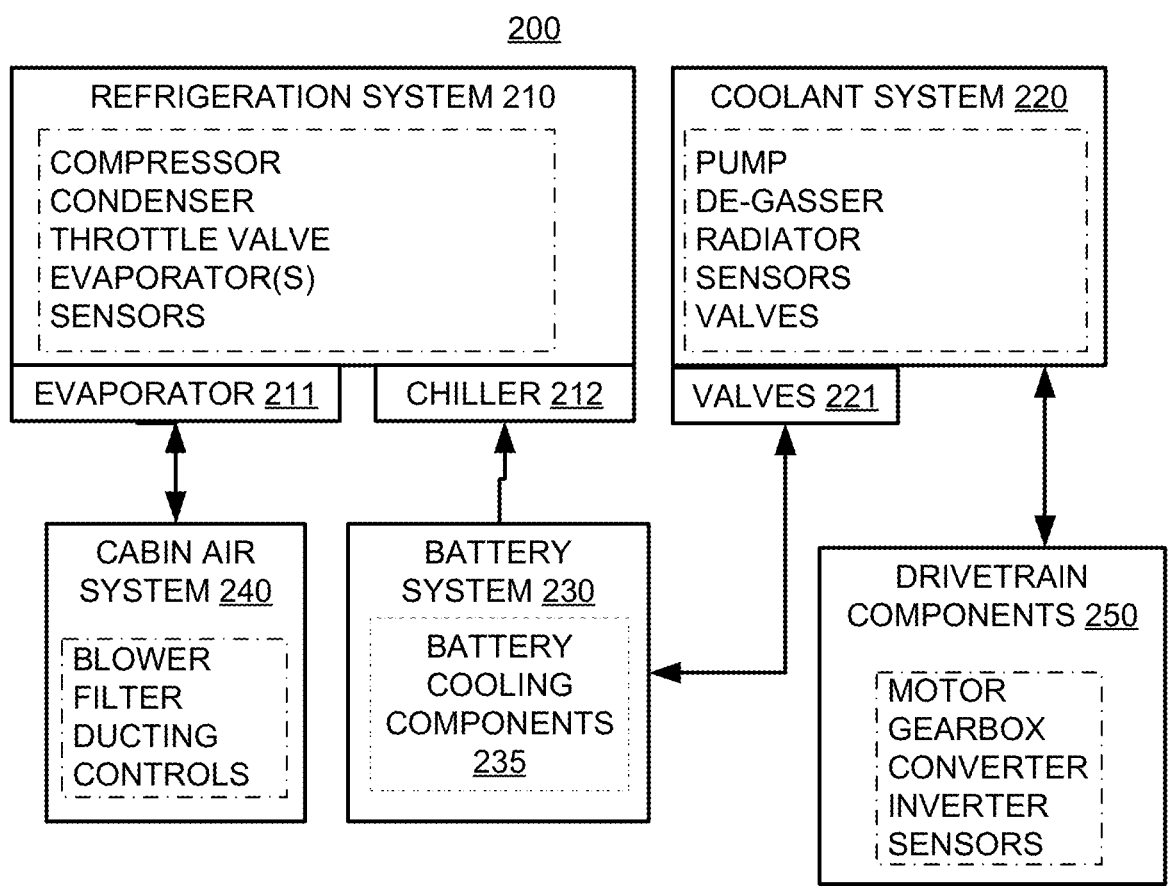
FIG. 2 shows a block diagram of illustrative cooling systems of an electric vehicle, in accordance with some embodiments of the present disclosure.

FIG. 2 shows a block diagram of illustrative cooling systems of an electric vehicle, in accordance with some embodiments of the present disclosure. The cooling systems are arranged as part of thermal architecture 200, and include refrigeration system 210, coolant system 220, drivetrain components 250, battery system 230 (e.g., which includes battery cooling components 235, as illustrated, and a plurality of batteries), and cabin air system 240. To illustrate, refrigeration system 210 may interface to cabin air system 240 via evaporator 211, to battery system 230 via chiller 212 (e.g., and via battery cooling components 235), and to drivetrain components 250 via coolant system 220 and valves 221. To illustrate further, drivetrain components 250 and battery system 230 may interface to coolant system 220 (e.g., coolant is provided to each system).

In an illustrative example, a vehicle controller may monitor and control battery system 230, and determine when cooling is needed (e.g., based on ambient conditions, driving conditions, or both). Additionally, an occupant may adjust controls of cabin air system 240 to provide cooled air to an occupant compartment. A control system, as illustrated in FIG. 3, may be configured to manage cooling, heating, or a combination thereof for any or all of battery system 230, drivetrain components 250 (e.g., which may include a drive system and/or drive cooling system), and cabin air system 240 based on the varying demands of each system.

Refrigeration system 210, as illustrated, includes a compressor, a condenser, a throttle valve, an evaporator, and sensors. Coolant system 220, as illustrated, includes one or more pumps, de-gassers, radiators, sensors, and valves. Drivetrain components 250, as illustrated, includes drive units (e.g., motors, gearboxes, and mechanisms), DC-DC converters, DC-AC inverters, and sensors, any or all of which may include coolant passages that interface to coolant system 220. In an illustrative example, drivetrain components 250 may include a plurality of drive units, a plurality of electric motors (e.g., four electric motors, corresponding to a respective wheel of a vehicle), or otherwise one or more systems for generating torque at wheels of the vehicle. Battery cooling components 235 of battery system 230 may include one or more pumps, valves, cooling jackets (e.g., interfacing to other components of battery system 230), sensors, any other suitable components, or any combination thereof. Cabin air system 240, as illustrated, may include one or more blowers, filters, ducting, and controls for providing conditioned air to an occupant compartment or zones thereof.

Although illustrated as separate, refrigeration system 210, coolant system 220, drivetrain components 250, battery system 230, and cabin air system 240 may overlap, be interfaced to each other via one or more components (e.g., valves, fittings, conduits, cooling jackets, heat exchangers such as chillers or evaporators), or otherwise be modified from illustrative thermal architecture 200. Further, the boundary delineating each system is merely illustrative. For example, battery cooling components 235 may be illustrated as integrated as part of battery system 230. In a further example, heat exchangers (e.g., evaporators, chillers) for exchanging heat among systems may be illustrated as being part of either system or both systems. Accordingly, system delineations illustrated herein are merely exemplary for purposes of discussion. In some embodiments, battery system 230 (e.g., or battery cooling components 235 thereof) includes an in-line heater for providing heat to battery system 230.

Figure 3:
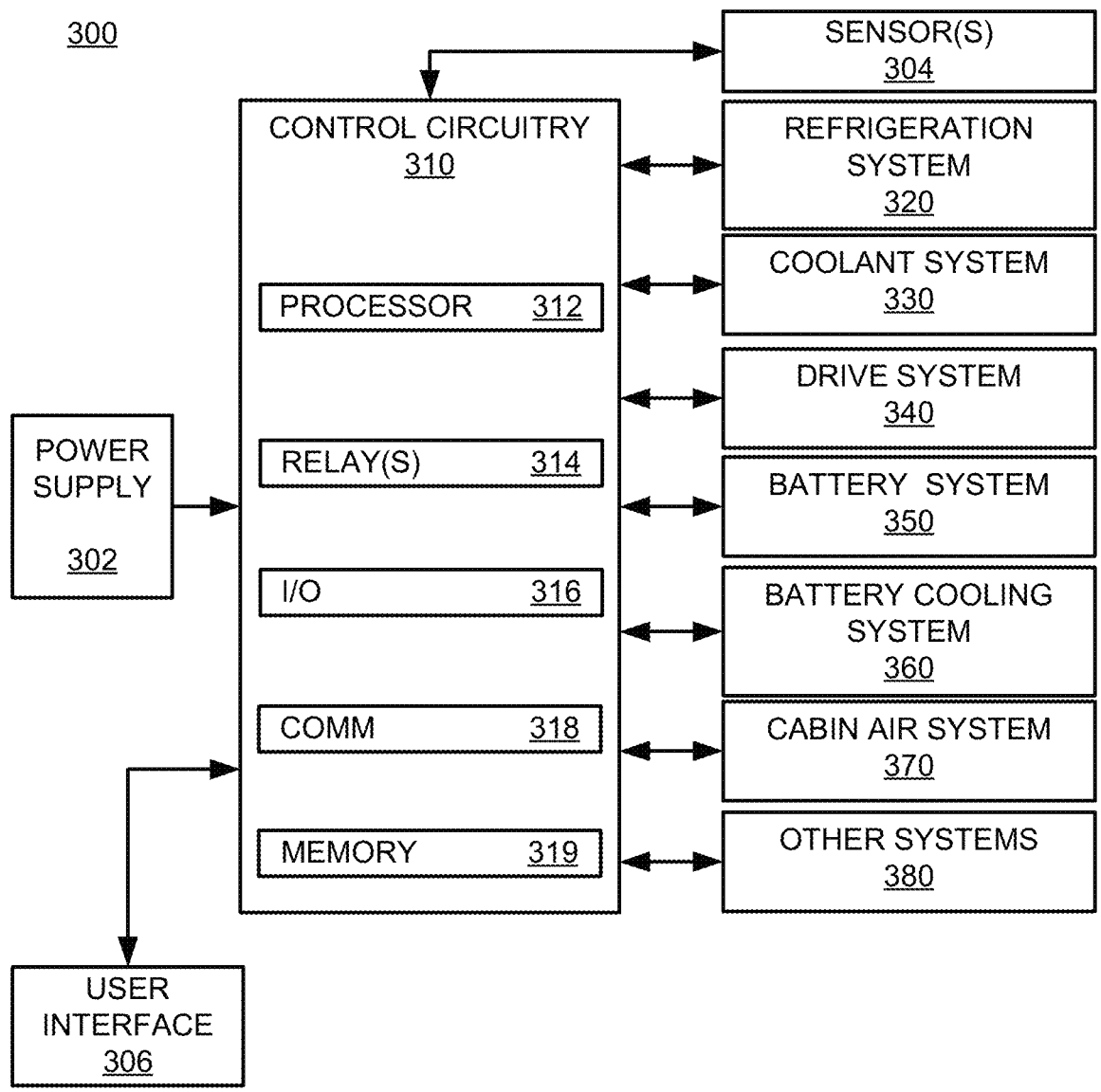
FIG. 3 shows a block diagram of an illustrative system for controlling heat transfer for an electric vehicle, in accordance with some embodiments of the present disclosure.

FIG. 3 shows a block diagram of illustrative system 300 for controlling heat transfer for an electric vehicle, in accordance with some embodiments of the present disclosure. For example, system 300 may be included as part of vehicle 100 of FIG. 1, or thermal architecture 200 of FIG. 2. As illustrated, system 300 includes control circuitry 310, sensors 304, user interface 306, power supply 302, refrigeration system 320, coolant system 330, drive system 340, battery system 350, battery cooling system 360, cabin air system 370, and any other (suitable) systems 380 in accordance with some embodiments of the present disclosure. Illustrative control circuitry 310 includes processor 312, one or more relays 314 (hereinafter referred to as relay(s) 314), input/output 316 (hereinafter referred to as I/O 316), communication hardware 318 (hereinafter referred to as COMM 318), and memory 319.

Control circuitry 310 may include hardware, software, or both, implemented on one or more modules configured to provide control of a cooling system. In some embodiments, processor 312 includes one or more microprocessors, microcontrollers, digital signal processors, programmable logic devices, field-programmable gate arrays (FPGAs), application-specific integrated circuits (ASICs), or any suitable combination thereof. In some embodiments, processor 312 is distributed across more than one processor or processing units. In some embodiments, control circuitry 310 executes instructions stored in memory (e.g., non-transitory computer readable media) for managing cooling of a cabin and a battery system. In some embodiments, memory 319 is an electronic storage device that is part of control circuitry 310. For example, memory may be configured to store electronic data, computer instructions, applications, firmware, or any other suitable information. In some embodiments, memory 319 includes random-access memory, read-only memory, hard drives, optical drives, solid state devices, or any other suitable memory storage devices, or any combination thereof. For example, memory may be used to launch a start-up routine.

In some embodiments, control circuitry 310 is powered by power supply 302. In some embodiments, power supply 302 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 302 supplies power to refrigeration system 320, coolant system 330, drive system 340, battery system 350, battery cooling system 360, cabin air system 370, and any other suitable systems 380, or any combination thereof.

In some embodiments, user interface 306 includes a push button, a toggle switch, a turnable knob, a display screen (e.g., a touch screen), a key fob, a key-lock combination, any other suitable system or component for receiving input from a user or providing output to a user, or any combination thereof. In some embodiments, user interface 306 includes a touchscreen on the dash of a vehicle, configured to receive input from the user, and provide a display to the user. In some embodiments, user interface 306 includes one or more buttons that are selectable by a user. For example, the one or more buttons may include a button coupled to a switch, a button on a touchpad, any other suitable button that may be used by a user to make a selection, or any combination thereof. In some embodiments, user interface 306 includes one or more turnable knobs that a user may turn to adjust a temperature setting, blower setting, drive mode, or another suitable setting.

In some embodiments, sensor(s) 304 include one or more temperature sensors (e.g., at least one thermocouple, thermistor, resistance temperature detector, or optical sensor), pressure sensors (e.g., piezo or strain-based transducers), speed sensors (e.g., a rotary encoder), position sensors (e.g., a rotary encoder), current sensors (e.g., of a compressor motor), flow sensors, any other suitable sensors, or any combination thereof. For example, sensor(s) 304 may be used to measure temperature of a component (e.g., a heat exchanger, a chiller, a compressor), a fluid (e.g., air, coolant, refrigerant, or any other suitable gas/vapor, liquid, mixture, slurry, or combination thereof), or a combination thereof. In a further example, sensor(s) 304 may be used to measure pressure or a difference in pressure of a fluid (e.g., air, coolant, or refrigerant, or any other suitable gas/vapor, liquid, mixture, slurry, or combination thereof). In a further example, sensor(s) 304 may be used to measure a flow rate in air, coolant, or refrigerant (e.g., to determine a cooling or heating rate). Sensor(s) 304 is also referred to herein as sensors 304, and accordingly may include one or more sensors of any suitable type or types.

Coolant system 330 may be the same as, similar to, or included as part of coolant system 220 of FIG. 2. In some embodiments, refrigeration system 320, having a refrigerant as a working fluid, includes a compressor, condenser, one or more control valves (e.g., throttle valves), and at least one heat exchanger (e.g., a chiller and/or evaporator, or interface thereto). Refrigeration system 320 may be coupled to coolant system 330, battery cooling system 360, cabin air system 370, or other suitable systems 380 by a single heat exchanger (e.g., an evaporator), two or more heat exchangers coupled in series and/or parallel, or any other suitable heat exchanger configuration in accordance with the present disclosure.

Drive system 340 may be the same as, similar to, or include drivetrain components 250 of FIG. 2, or drive units 150 and 160 of FIG. 1. For example, drive system 340 may include one or more front drive units, rear drive units, or both, which may each include a motor coupled via a gearset to an output shaft that corresponds to a wheel or a drive axis of the vehicle. To illustrate, each drive unit may include a motor coupled to a gearbox having a lubricating oil system and cooling passages (e.g., for interfacing to coolant system 330), wherein the motor is electrically coupled to an inverter or otherwise power electronics (e.g., a motor drive). In some embodiments, drive system 340 may include, or otherwise be interfaced to, a drive cooling system that may include one or more pumps, valves, fittings, conduits, heat exchangers, sensors, any other suitable components, or any combination thereof. To illustrate, drive system 340 may interface to coolant system 330, which may include the drive cooling system. In an illustrative example, drive system 340 may include a plurality of electric motors (e.g., more than one electric motor such as four electric motors), which may be configured to generate heat. In some embodiments, drive system 340 may include more than one electric motor, and accordingly heat may be generated in the electric motors (e.g., relatively more heat than a single motor). For example, because the vehicle may include a plurality of electric motors and corresponding power electronics (e.g., for generating current in the electric motors), heat may be generated in each of the electric motors (e.g., under normal operation and during application of excess current to generate further heat or excess heat). To illustrate, control circuitry 310 may be configured to generate control signals for each electric motor of drive system 340 (e.g., four sets of control signals for a respective four electric motors), of which all or some may generate heat that may be transferred to a battery system or dissipated by a radiator (e.g., depending on the operating mode/configuration).

Battery cooling system 360 may be included as part of, or otherwise interfaced to, battery system 350. In some embodiments, battery cooling system 360 includes a liquid circulation system for cooling one or more battery modules, each including a plurality of battery cells, power electronics, chargers, and/or other suitable components. In some embodiments, control circuitry 310 or another suitable control system is configured to adjust the flow rate, pressure, or both, provided by a pump of battery cooling system 360. For example, the pump may be controlled to increase flow rate as heat load increases (e.g., for a rotary pump coupled to at motor, the rotation rate may be increased by increasing motor current/rotation rate). In a further example, battery cooling system 360 may include one or more control valves for diverting, adjusting, or otherwise controlling flow based on the heat load. To illustrate, as the current demand increases from the battery pack, the cooling requirement (e.g., power) may also increase to maintain the battery pack temperature within an operable range (e.g., below a temperature limit to avoid overheating). For example, the heat rejection of the heat load may depend on driving conditions (e.g., current demand at electric motors of the drivetrain of the vehicle), ambient conditions, one or more temperature limits (e.g., of battery cells, battery modules, battery coolant temperature, power electronics temperature, or any other suitable temperature), any other suitable criterion, or any combination thereof. In some circumstances (e.g., cold weather climates), battery cooling system 360 may be used to provide heating to battery system 350 to warm up the battery cells to a desired operating temperatures. In some embodiments, an optional positive temperature coefficient (PTC) heater may be used to heat the battery alone or in combination with using the heat from the power electronics and/or e machines.

Cabin air system 370 may be the same as or similar to, or included as part of, cabin air system 140 of FIG. 1, or cabin air system 240 of FIG. 2. In some embodiments, cabin air system 370 includes an air circulation system for providing temperature-controlled air to an occupant compartment of a vehicle. For example, cabin air system 370 may include a blower, configured to blow air through, and exchange heat with, one or more heat exchangers.

Other systems 380 may include auxiliary systems (e.g., a user-controlled cooler for beverages), controllers or modules (e.g., having processors), electronics, display devices, or other suitable systems that may interface to refrigeration system 320 or coolant system 330.

Illustrative system 300 of FIG. 3, or aspects thereof, may be used to control any suitable cooling system disclosed herein and implement any suitable method disclosed herein, in accordance with the present disclosure. In some embodiments, not all components shown in FIG. 3 need be included in system 300. For example, in some embodiments, control circuitry 310 may be configured to control coolant system 220 and refrigeration system 320, while battery cooling system 360 and cabin air system 370 are controlled by other control circuitry (e.g., a separate processor and/or control algorithm). In some embodiments, control circuitry 310 is configured to determine an operation mode such as default mode, mixed mode, cooling mode, heating mode, or any other suitable mode (e.g., which defines how the system operates). For example, control circuitry 310 may execute computer readable instructions stored on non-transitory computer readable media to select from among operating modes (e.g., based on input from user interface 206), retrieve reference information (e.g., from memory), generate and transmit control signals to any system of system 300, receive and process sensor signals, or a combination thereof. System 300, or control circuitry 310 thereof, may be referred to herein as a control system (e.g., for controlling thermal management of an electric vehicle). It will be understood that a mode, as referred to herein, corresponds to any suitable form of operation for providing heating, cooling, or a combination thereof.

Figure 4:
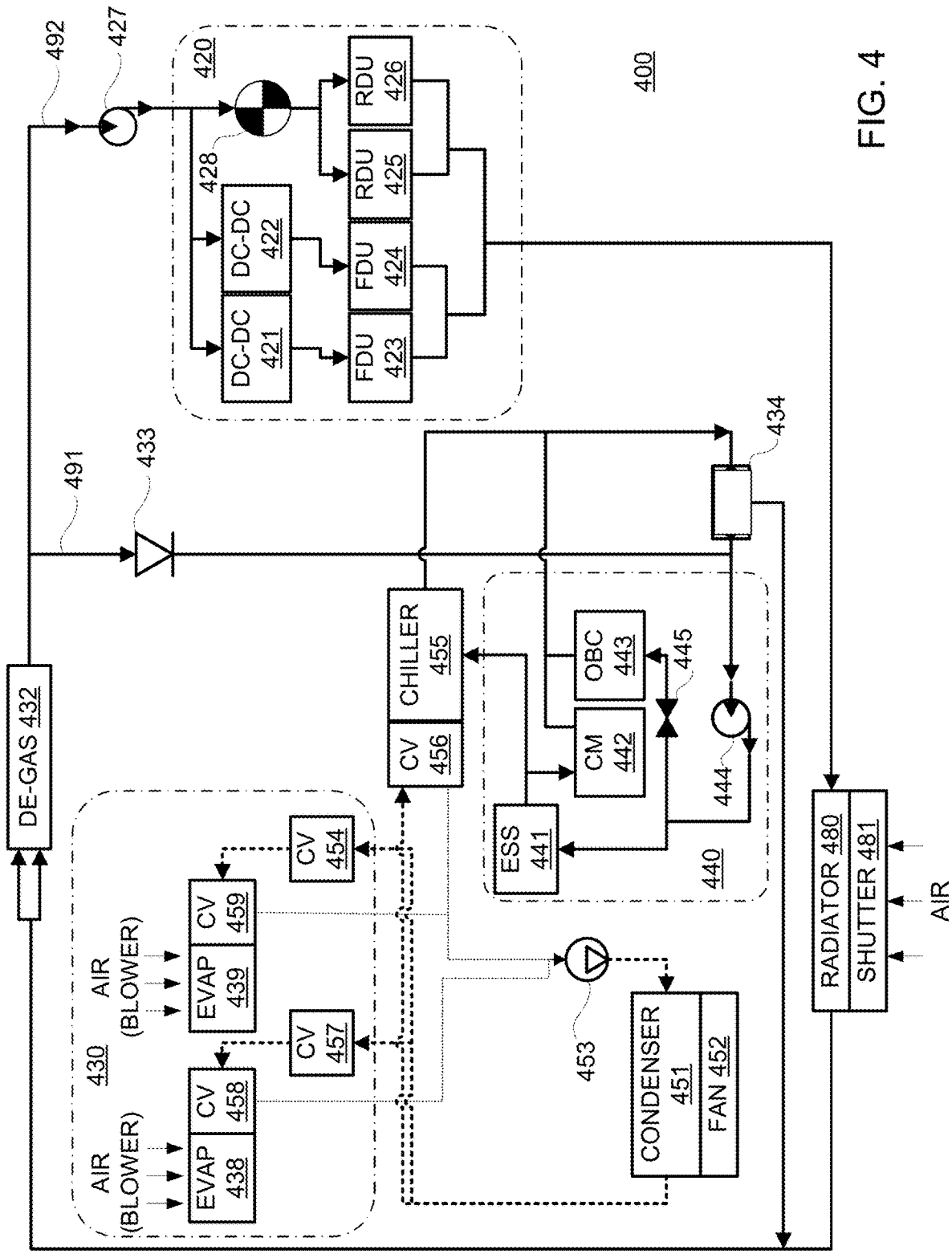
FIG. 4 shows a block diagram of an illustrative thermal architecture of an electric vehicle, in accordance with some embodiments of the present disclosure.

FIG. 4 shows a block diagram of illustrative thermal architecture 400 of an electric vehicle, in accordance with some embodiments of the present disclosure. Thermal architecture 400 represents an example of thermal architecture 200 of FIG. 2 (e.g., as included in vehicle 100 of FIG. 1). For example, thermal architecture 400 also represents an example of aspects of system 300 of FIG. 3 (e.g., the components of thermal architecture 400 may be controlled and/or monitored by control circuitry 310). As illustrated, thermal architecture 400 includes:

DC-DC converters 421 and 422 (e.g., coupled to energy storage system 441 and drive units);

front drive units (FDU) 423 and 424 (e.g., including motor, gearbox, and/or inverter cooling);

rear drive units (RDU) 425 and 426 (e.g., including motor, gearbox, and/or inverter cooling);

pump 427 (e.g., coolant pump for drive system 420);

valve 428 (e.g., two-way valve for coolant directed to drive system 420);

radiator 480 with shutter 481 (e.g., for liquid-to-air cooling of coolant from drive system 420);

de-gas unit 432 (e.g., for de-aerating coolant, and optionally including filtration);

valve 433 (e.g., a check valve for controlling flow to battery system 440);

multi-way (e.g., two, three, four, five-way) valve 434 (e.g., to direct a fluid such as coolant within battery system 440 and among drive system 420 and battery system 440);

pump 444 (e.g., a coolant pump for battery system 440);

energy storage system 441 (e.g., of battery system 440);

control module (CM) 442 (e.g., of battery system 440);

on-board charger (OBC) 443 (e.g., of battery system 440);

restrictor 445 (e.g., to affect the proportional of coolant flow through ESS 441 and OBC 443);

chiller 455 (e.g., interfaced to or part of battery system 440);

control valve 456 (e.g., electronic expansion valves);

compressor 453 (e.g., of a thermal refrigeration system);

condenser 451 with fan 452 (e.g., of a thermal refrigeration system);

control valves 457 and 454 (e.g., shutoff valves with solenoids);

control valves 458 and 459 (e.g., thermal expansion control valves); and evaporators 438 and 439 (e.g., interfaced to or part of cabin air system 430).

As illustrated, thermal architecture 400 includes a coolant stream, a refrigerant stream, and air streams. For example, coolant (e.g., a liquid coolant having any suitable additives) is provided to components of drive system 420 and battery system 440. In a further example, refrigerant is provided to control valve 456 interfaced to chiller 455 to cool the coolant downstream of ESS 441 and to control valves 458 and 459 interfaced to respective evaporators 438 and 439 to cool air (e.g., provided by blower fans). To illustrate, chiller 455 may include a liquid-liquid heat exchanger (e.g., refrigerant-coolant), with the refrigerant flow, pressure, or both controlled using control valve 456 (e.g., an electronically controlled expansion valve). To illustrate further, each of evaporators 438 and 439 may include a liquid-gas heat exchanger (e.g., refrigerant-air), with the refrigerant flow, pressure, or both controlled using respective control valves 458 and 459 (e.g., electronically controlled thermal expansion valves). In some embodiments, a control system such as control circuitry 310 of system 300 of FIG. 3, for example, is configured to generate and transmit control signals to pump 427, pump 444, compressor 453, fan 452, shutter 481, blowers (e.g., for cabin air), control valve 458, control valve 459, control valve 457, control valve 454, control valve 456, (three-way) valve 434, valve 428, any other suitable control components, or any combination thereof. In some embodiments, a control system such as control circuitry 310 of system 300 of FIG. 3, for example, is configured to generate and transmit control signals to DC-DC converters 421 and 422, drive units (e.g., FDUs 423 and 424, RDUs 425 and 426), ESS 441, OBC 443, CM 442, de-gas unit 432 (e.g., which may include one or more valves), any other suitable subsystems, or any combination thereof.

Pump 427 is configured to pump coolant through drive system 420 to radiator 480, and then to de-gas unit 432. As illustrated, drive system 420 includes cooling passages coupled by any suitable conduits and fittings. Valve 428 is configured to allow or disallow, or otherwise control coolant flow through RDUs 425 and 426. In some embodiments, valve 428 includes a two-way valve configured to opened or closed based on control signals. In some embodiments, valve 428 includes a flow control valve or otherwise controllable restriction (e.g., a proportional valve which closes fully or partially), configured to adjust the proportion of coolant flow through RDUs 425 and 426 and FDUs 423 and 424 based on control signals. As illustrated, thermal architecture 400 includes DC-DC converters 421 and 422, arranged in-line with at least some drive units (e.g., in-line with FDUs 423 and 424, as illustrated).

As illustrated, a parallel loop of coolant may flow through valve 433, depending on, for example, the position of valve 434. In some embodiments, (i) in a first position of valve 434, coolant can flow through valve 433 in one direction, as illustrated, to valve 434 and then join the output of radiator 480, and (ii) in a second position of valve 434, coolant can flow to the inlet of pump 444, to ESS 441, and then to chiller 455 and ACM 442, then to OBC 443, and then out of battery system 440 via valve 434 (e.g., a three-way valve). In some embodiments, (i) in a first position of valve 434, coolant can flow through valve 433 in one direction, as illustrated, to valve 434 and then join the output of radiator 480, and (ii) in a second position of valve 434, in a second position of valve 434, coolant can flow from the outlet of chiller 455 and OBC 443 to valve 434 and then to pump 444 (e.g., in the second position, there is little to no flow through valve 433 and no flow to de-gas unit 432 from valve 434). In some embodiments, valve 434 is a solenoid-actuated two-position valve (ON1-ON2) or three position valve (e.g., ON1-OFF-ON2). In some embodiments, valve 434 includes one or more flow control valves (e.g., with variable flow coefficient) for controlling flow or a proportion of flow between two paths. In some embodiments, as illustrated, the coolant flow in cooling path 491 is provided to pump 444, and at the outlet of pump 444, the coolant flow is separated to cool both a plurality of batteries (e.g., of ESS 441) and OBC 443.

Control module 442 may include an autonomous control module (ACM) configured to control aspects of autonomous vehicle operation, an (XMM). In some embodiments, control module 442 includes a display, a user input, control circuitry, memory, an audio interface, a sensor interface, any other suitable components, or any combination thereof.

Although illustrated as separate evaporators 438 and 439 coupled in parallel, a cooling system may include a single heat exchanger (e.g., an evaporator), two heat exchangers coupled in series, or any other suitable heat exchanger configuration in accordance with the present disclosure. Compressor 453 may include any suitable compressor type, driven by an electric motor (e.g., induction motor, switched reluctance motor, or any other suitable electric motor type) and corresponding power electronics of control circuitry 310 (e.g., I/O 316 thereof). The speed of compressor 453 may be controlled by controlling current in each phase of the motor, voltage across each phase of the motor, or a combination thereof over time (e.g., using transistors, a bridge circuit, a variable frequency drive, or using any other suitable control hardware). The pressure of the working fluid (i.e., refrigerant) increases across compressor 453, from a suction pressure at the inlet to an outlet pressure downstream. Condenser 451 may include a liquid-to-air heat exchanger (e.g., a radiator), or any other suitable type of liquid-to-gas or liquid-to-liquid heat exchanger, which is configured to reject heat to a heat receptacle (e.g., environmental air). Valves 458, 459, and 456 are configured to reduce the pressure and temperature of the working fluid (e.g., via a throttling process approximated as a constant enthalpy or near-constant enthalpy process), without requiring or producing a work interaction. In some embodiments, valves 458, 459, and 456 may be controllable (e.g., have an adjustable effective area), or may be fixed in geometry (e.g., a geometrically fixed flow restriction). Evaporators 438 and 439 of the thermal refrigeration system may include a flat plate heat exchanger (e.g., in a crossflow, co-flow, or counter flow arrangement), channeled heat exchanger, a tube and shell heat exchanger, any other suitable heat exchanger, or any combination thereof. In some embodiments, one or both of evaporators 438 and 439 have control valves (e.g., flow control valves) arranged at the inlet, outlet, or both of either or both streams to control one or more flow rates (e.g., of refrigerant, coolant, or air).

Battery system 440, as illustrated, includes or is otherwise interfaced to at least part of a battery cooling system having one or more fittings, conduits (e.g., tubing, piping, hosing), valves, pumps, and heat exchangers (e.g., chiller 455). In some embodiments, battery system 440 includes a liquid circulation system for cooling one or more battery modules (e.g., of ESS 441), each including a plurality of battery cells. For example, as illustrated, battery system 440 includes pump 444 and heat loads (e.g., ESS 441, OBC 443, CM 442) that exchange heat with coolant. In some embodiments, control circuitry 310 of FIG. 3, or another suitable control system, is configured to adjust the flow rate, pressure, or both, provided by pump 444. For example, pump 444 may be controlled to increase flow rate as heat load increases (e.g., for a rotary pump coupled to at motor, the rotation rate may be increased by increasing motor current/rotation rate). In a further example, the battery cooling system of battery system 440 may include one or more control valves for diverting, adjusting, or otherwise controlling flow based on the heat load. To illustrate, as the current demand increases from the battery pack (e.g., ESS 441), the cooling requirement in kW may also increase to maintain the battery pack temperature within an operable range (e.g., below a temperature limit to avoid overheating). For example, the heat rejection of ESS 441 may depend on driving conditions (e.g., current demand at electric motors of the drivetrain of the vehicle), ambient conditions, one or more temperature limits (e.g., of battery cells, battery modules, battery coolant temperature, power electronics temperature, or any other suitable temperature), any other suitable criterion, or any combination thereof. It will be understood that the battery cooling system may include any of the components illustrated, any other suitable components not illustrated, or any combination thereof (e.g., as illustrated and described in the context of FIGS. 2-3).

Cabin air system 430 may be the same as or similar to, or included as part of, cabin air system 140 of FIG. 1, cabin air system 240 of FIG. 2, or cabin air system 370 of FIG. 3. In some embodiments, cabin air system 430 includes an air circulation system for providing temperature-controlled air to an occupant compartment of a vehicle. For example, as illustrated, cabin air system 430 includes one or more blowers, configured to blow air through, and exchange heat with, heat exchangers (e.g., evaporators 438 and 439). In some embodiments, the blower is controlled by control circuitry 310 of FIG. 3 based on input from user interface 306 (e.g., a position of a turnable knob), input from another controller (e.g., a central controller), or input from any other suitable source. In some embodiments, one or more flow control valves (e.g., control valves 458 and 459), diversion valves (e.g., bypass valves), or dampers may be coupled to evaporators 438 and 439 to control refrigerant flow and/or air flow. For example, heat transfer, fluid temperature, or both may be controlled by controlling a flow rate through evaporators 438 and 439. In some embodiments, one or more flow control valves may be included to control flow rates through evaporators 438 and 439 (e.g., relative flow rates, total flow rate, or otherwise each individual flow rate). It will be understood that cabin air system 430 may include any of the components illustrated, any other suitable components not illustrated, or any combination thereof.

In an illustrative example, drive system 420, as illustrated, includes four drive units (e.g., FDUs 423 and 424, RDUs 425 and 426), in which heat may be generated from current flow. During normal operation of electric motors of FDUs 423 and 424, RDUs 425 and 426, heat may be generated based on currents. In some embodiments, excess currents (e.g., in excess of currents during normal operation) may be applied to the electric motors (e.g., phases thereof) to increase the current flow in the electric motors with or without affecting the resulting torque of the electric motors. For example, for a particular electric motor or motors of drive system 420, excess current may be applied by operating less efficiently (electromechanically) to generate increased heat from motor and/or ohmic losses.

Figure 5:
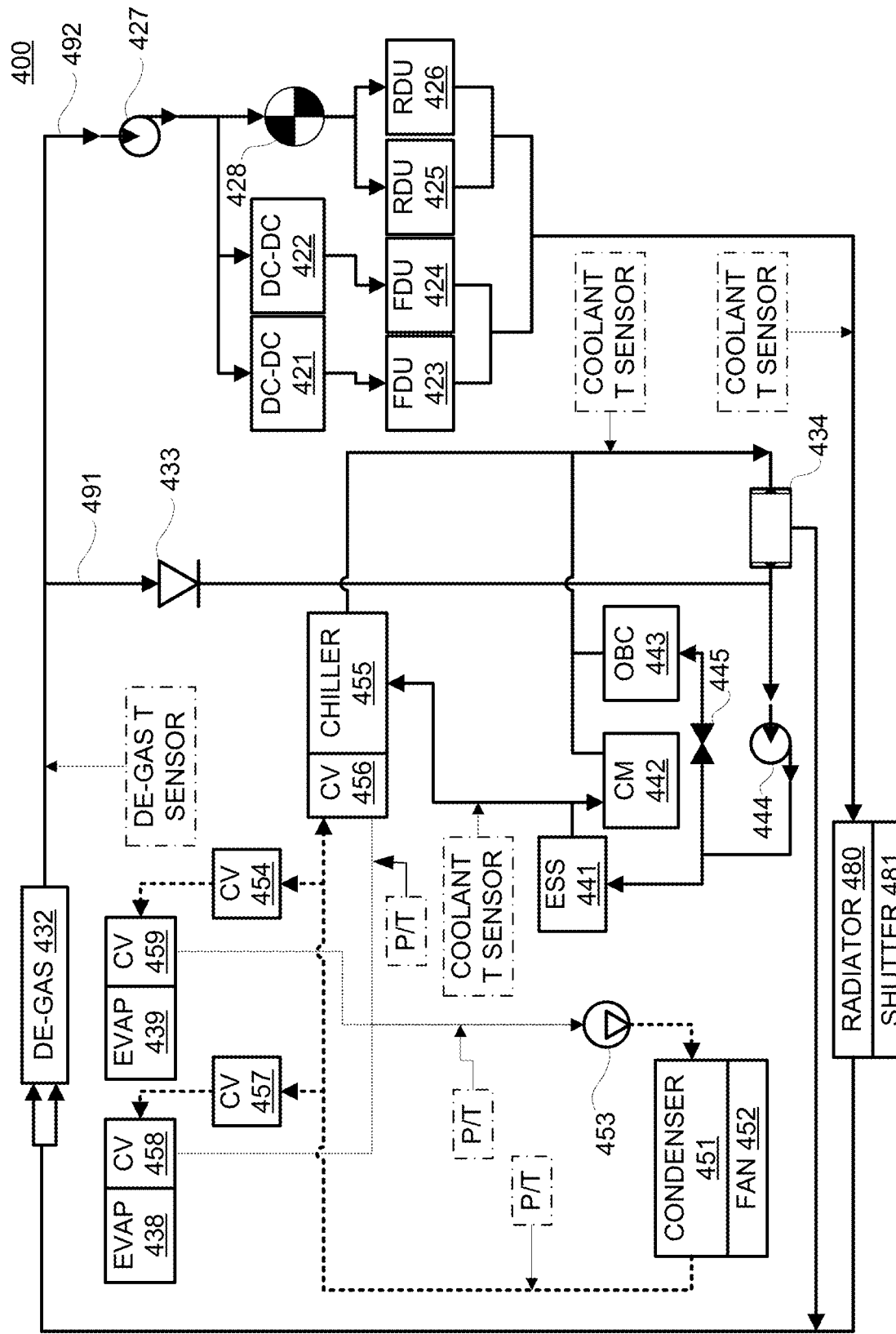
FIG. 5 shows a block diagram of the illustrative thermal architecture of FIG. 4, with instrumentation indicators, in accordance with some embodiments of the present disclosure.

FIG. 5 shows a block diagram of illustrative thermal architecture 400 of FIG. 4, with instrumentation indicators, in accordance with some embodiments of the present disclosure. Instrumentation may include temperature sensors, pressure sensors, flow sensors, current sensors, voltage sensors, impedance sensors, any other suitable sensors, or any combination thereof. As illustrated in FIG. 5, instrumentation may include:

radiator 480 inlet temperature (e.g., a coolant temperature);

drive system 420 outlet temperature (e.g., a coolant temperature);

a temperature of radiator 480 (e.g., an embedded or surface mounted temperature sensor);

valve 434 inlet temperature (e.g., a coolant temperature);

de-gas unit 432 outlet temperature (e.g., a coolant temperature);

ESS 441 outlet temperature (e.g., a coolant temperature);

chiller 455 inlet temperature (e.g., a coolant temperature);

chiller 455 temperature and/or pressure (e.g., refrigerant temperature and/or pressure, of the inlet and/or outlet of the refrigerant side of chiller 455);

compressor 453 inlet temperature and/or pressure (e.g., a coolant temperature and/or pressure);

condenser 451 outlet temperature and/or pressure (e.g., a coolant temperature and/or pressure);

any other suitable sensor, or any combination thereof.

In some embodiments, thermal architecture 400 may include sensors for sensing current (e.g., in electronic circuitry), electric power, temperature (e.g., of a coolant or component), or other suitable property of drive system 420 or components thereof. For example, DC-DC converters 421 and 422, drive units (e.g., FDUs 423 and 424, RDUs 425 and 426), other power electronics, or a combination thereof may include one or more current sensors and voltage sensors for determining power transfer in drive system 420. In a further example, current sensors, voltage sensors, temperature sensors, or a combination thereof may be used to control excess current and corresponding heat generation for use in battery-heating.

In an illustrative example, a system may include control circuitry 310 and thermal architecture 400. For example, the system may include a sensor interface (e.g., I/O 316 of FIG. 3), configured to generate a plurality of sensor signals (e.g., from received signals from sensors 304), wherein the plurality of sensor signals comprise at least one sensor signal corresponding to a fluid temperature. The system may also include an output interface configured to transmit at least one control signal (e.g., I/O 316 of FIG. 3). The system includes control circuitry (e.g., some or all of control circuitry 310 of FIG. 3) coupled to, or integrated or otherwise combined with, the sensor interface (e.g., I/O 316 of FIG. 3) and to the output interface (e.g., I/O 316 of FIG. 3). The control circuitry may be configured to receive the plurality of sensor signals from the sensor interface (e.g., from I/O 316, received from sensors 304). The control circuitry may be configured to cause heat to be generated by a drive system (e.g., drivetrain components 250 of FIG. 2, drive system 340 of FIG. 3, or drive system 420 of FIG. 4) cooled by a drive cooling system (e.g., coolant system 330 of FIG. 3). The control circuitry may be configured to cause the output interface (e.g., I/O 316 of FIG. 3) to generate a control signal for controlling at least one control valve (e.g., of coolant system 220 of FIG. 2, coolant system 330, battery cooling system 360, and/or other systems 380 of FIG. 3) that controls flow of fluid such as coolant to the drive cooling system (e.g., coolant system 330 of FIG. 3) and to a battery cooling system (e.g., of battery system 230 of FIG. 2, battery cooling system 360 of FIG. 3, or battery system 440 of FIG. 4).

Figure 6:
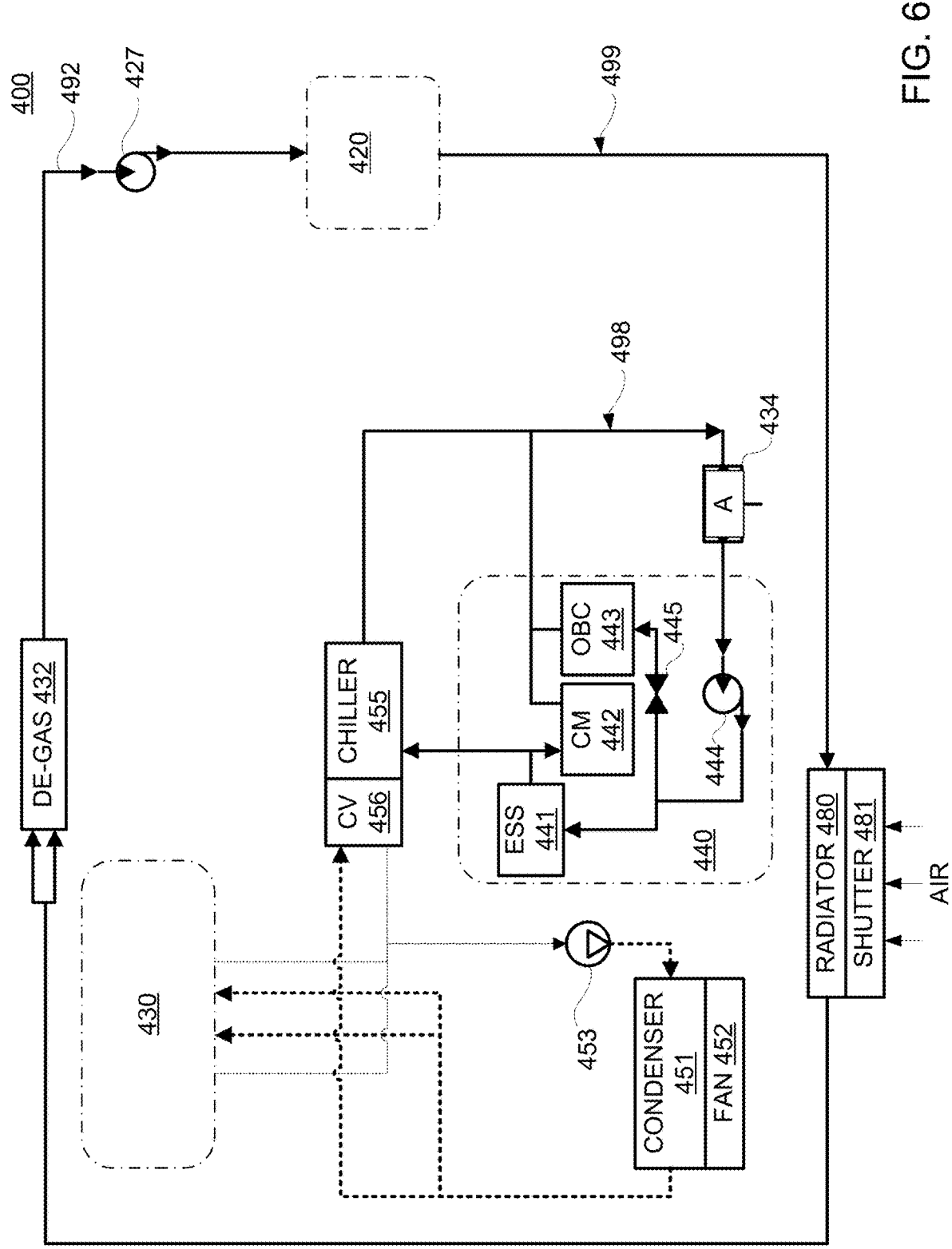
FIG. 6 shows a block diagram of the illustrative thermal architecture of FIG. 4, operating in a cooling mode, in accordance with some embodiments of the present disclosure.

FIG. 6 shows a block diagram of illustrative thermal architecture 400 of FIG. 4, operating in a cooling mode (e.g., a cooling configuration), in accordance with some embodiments of the present disclosure. In the cooling mode, valve 434 is in a first configuration, coupling the output of chiller 455 to the input of pump 444. Further, in the cooling mode, the coolant flow in battery system 440 forms a "cooling loop" (e.g., cooling path 498) that is decoupled from the cooling of drive system 420. For example, because valve 434 decouples cooling path 498 from de-gas unit 432 and battery system 440, no coolant flows through valve 433 (e.g., except for make-up fluid, as there is no outlet from cooling path 498 to primary cooling path 499). In an illustrative example, the cooling mode illustrated in FIG. 6 may be referred to as a "normal mode" or "default mode," wherein chiller 455 is used to remove heat and/or regulate temperature of the components of battery system 440.

Figure 7:
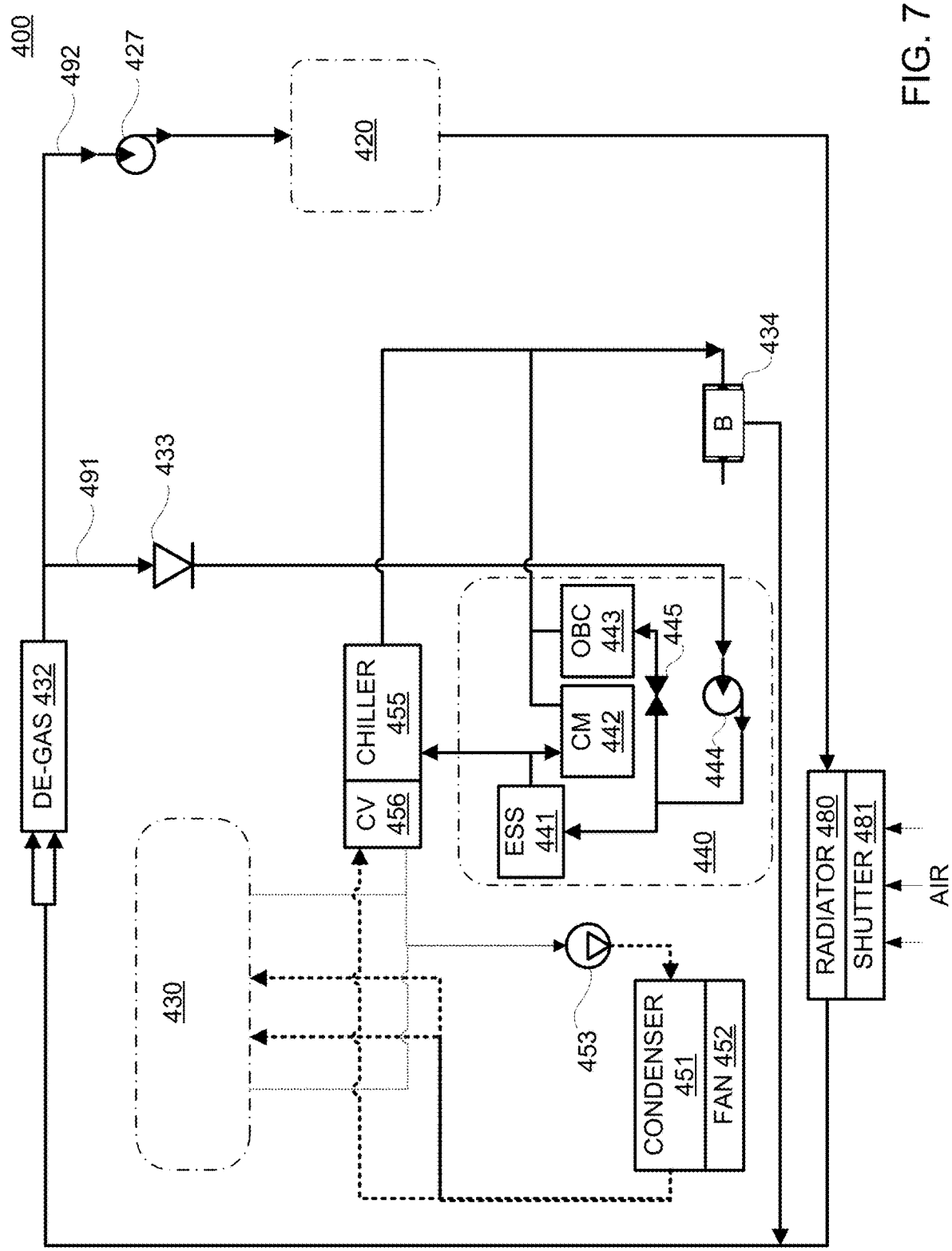
FIG. 7 shows a block diagram of the illustrative thermal architecture of FIG. 4, operating in a heating mode, in accordance with some embodiments of the present disclosure.

FIG. 7 shows a block diagram of illustrative thermal architecture 400 of FIG. 4, operating in a heating mode (e.g., a heating configuration), in accordance with some embodiments of the present disclosure. In the heating mode, valve 434 is in a second configuration, coupling coolant flow through valve 433 to the input of pump 444. Further, in the heating mode, the coolant flow in battery system 440 is provided via valve 433 from de-gas unit 432, and is provided to ESS 441 and OBC 443 without being cooled by chiller 455. For example, because the coolant flows from valve 433 to pump 444 and then to ESS 441 and OBC 443 prior to chiller 455, the coolant flow is capable of heating those components of battery system 440 (e.g., using thermal energy provided by drive system 420). Further, in the heating mode, the coolant flows out of chiller 455, through valve 434 to re-join coolant flow exiting from radiator 480 (e.g., from drive system 420). Accordingly, in the heating mode, chiller 455 does not provide direct cooling to coolant that is used to remove heat from ESS 441 and OBC 443. In an illustrative example, the heating mode illustrated in FIG. 7 may be referred to as a "mixed mode," wherein a control signal is provided to control valve 456 such that chiller 455 does not significantly remove heat and/or regulate temperature of the components of battery system 440. To illustrate, an output interface (e.g., COMM 318) may be configured to generate a control signal to control valve 434 that is configured to direct flow of a fluid from drive system 420 to battery system 440 to transfer the heat (e.g., the heat is transferred by the fluid).

In an illustrative example, a check valve (e.g., valve 433) arranged in cooling path 491 (e.g., a first cooling path) corresponding to a battery cooling system (e.g., of battery system 440) in parallel with cooling path 492 (e.g., a second cooling path) corresponding to drive system 420, wherein the check valve allows the coolant flow from a de-gas unit (e.g., de-gas unit 432) to the battery cooling system (e.g., of battery system 440). In a further illustrative example, a three-way valve (e.g., valve 434) arranged between the battery cooling system (e.g., of battery system 440) and the de-gas unit (e.g., de-gas unit 432) allows the coolant flow to proceed in cooling path 498 either coupled to, or decoupled from, cooling path 499.

In some embodiments, a control system (e.g., control circuitry 310 of system 300 of FIG. 3) is configured to select among a cooling mode (e.g., normal mode or default mode), a heating mode (e.g., mixed mode), and/or additional modes, by generating a suitable control signal and transmitting the control signal to one or more control components (e.g., a three-way valve illustrated as valve 434 in FIGS. 4-7). For example, coolant may flow from ESS 441 to chiller 455 and to CM 442 (e.g., XMM, ACM, or both). Further, coolant may flow from CM 442 and OBC 443 to join cooling returning from chiller 455, and then flow from chiller 455, OBC 443, and CM 442 together to return to a three-way valve (e.g., valve 434, as illustrated). In the heating mode, or "mixed mode" (e.g., illustrated in FIG. 7), the control system generates a control signal causing the three-way valve (e.g., valve 434) to direct the coolant flow to de-gas unit 432, wherein the coolant then returns to pump 444 through a check valve (e.g., valve 433), which prevents flow in the opposite direction (e.g., flow may only proceed in the direction of arrow, directed down as illustrated in FIGS. 4-7). To illustrate, mixed mode may be used for battery heating, de-aeration, or any other suitable purpose or combination of purposes. In the mixed mode, heat may be generated in drive system 420 by applying excess current to phases of the motor (e.g., internally shorting the motor) to generate ohmic heating. For example, control circuitry may generate a pulse-width modulation signal, or other suitable control signal, for controlling phase currents of electric machines of drive system 420. Excess current refers to current in excess of that normally required to generate a desired torque or force in the motor. For example, excess current may be applied to increase the total current dissipated in the electric machines (e.g., electric motors) while not necessarily increasing the resultant torque or force provided by the electric motor (e.g., the net effect of the excess current in the motor phases need not increase torque).

In an illustrative example, the coolant flow in thermal architecture 400 is not limited to a series arrangement. For example, the components of thermal architecture 400, and the arrangement thereof, allows the omission of a separate heater for components of battery system 440, the use of drive system 420 for heating of components of battery system 440 (e.g., to heat battery cells of ESS 441, and/or power electronics of OBC 443), and various operating modes to be achieved.

In some embodiments, heat from drive system 420 is used to warm up battery cells of ESS 441 in cold climates. For example, during heating (e.g., in mixed mode), shutter 481 may be turned off (e.g., closed) and control valve 456 would also be closed (e.g., to prevent cooling by chiller 455), thereby turning off those heat removal paths. Additionally, by operating both cooling paths 491 and 492 (e.g. cooling loops) in parallel (e.g., mixed mode), where the output flows are mixed together, the heat from drive system 420 will be transferred to components of battery system 440. An internal short or otherwise an inefficient way of driving motors of drive system 420 may be used to cause extra heat to be generated in drive system 420, which can then be provided to warm up components of battery system 440. In some embodiments, another mixed mode (e.g., an additional mode) may be selected, wherein the heat rejected from components of battery system 440 is transferred to chiller 455 (e.g., using control valve 456) and radiator 480 (e.g., using shutter 481) so that heat is removed in two different ways (e.g., when pump 427 is not turned on or otherwise not appreciably pumping coolant).

In an illustrative example, a system may include control circuitry (e.g., some or all of control circuitry 310 of FIG. 3) further configured to select from among a first mode and a second mode, wherein the first mode (e.g., see FIG. 7) corresponds to heating a battery system, and the second mode corresponds to cooling the battery system (e.g., see FIG. 6). To illustrate, in response to selecting the first mode, the control circuitry causes the heat to be generated in a drive system by applying excess current to phases of at least one electric motor of the drive system (e.g., drivetrain components 250 of FIG. 2, drive system 340 of FIG. 3, or drive system 420 of FIG. 4). The heat is transferred to the battery system (e.g., battery system 350 of FIG. 3 or battery system 440 of FIG. 4) by the flow of coolant. The first mode and the second mode may correspond to a first configuration and a second configuration (e.g., based on valve 434 and any other suitable components).

In a further illustrative example, a system may implement a combined mode, combining aspects of the cooling mode (e.g., FIG. 6) and heating mode (e.g., FIG. 7). For example, the system may adjust flow through each outlet port of valve 434 (e.g., the port coupled to de-gas unit 432 and the port coupled to battery system 440). To illustrate, in a combined mode, some of the flow entering valve 434 is directed to de-gas unit 432 and the rest of the flow is directed to battery system 440. Accordingly, valve 434 may be a two-position valve, a proportioning valve (e.g., for controlling flow to two outlet ports), or include more than one valve in parallel to distribute flow among flow paths.

Figure 8:
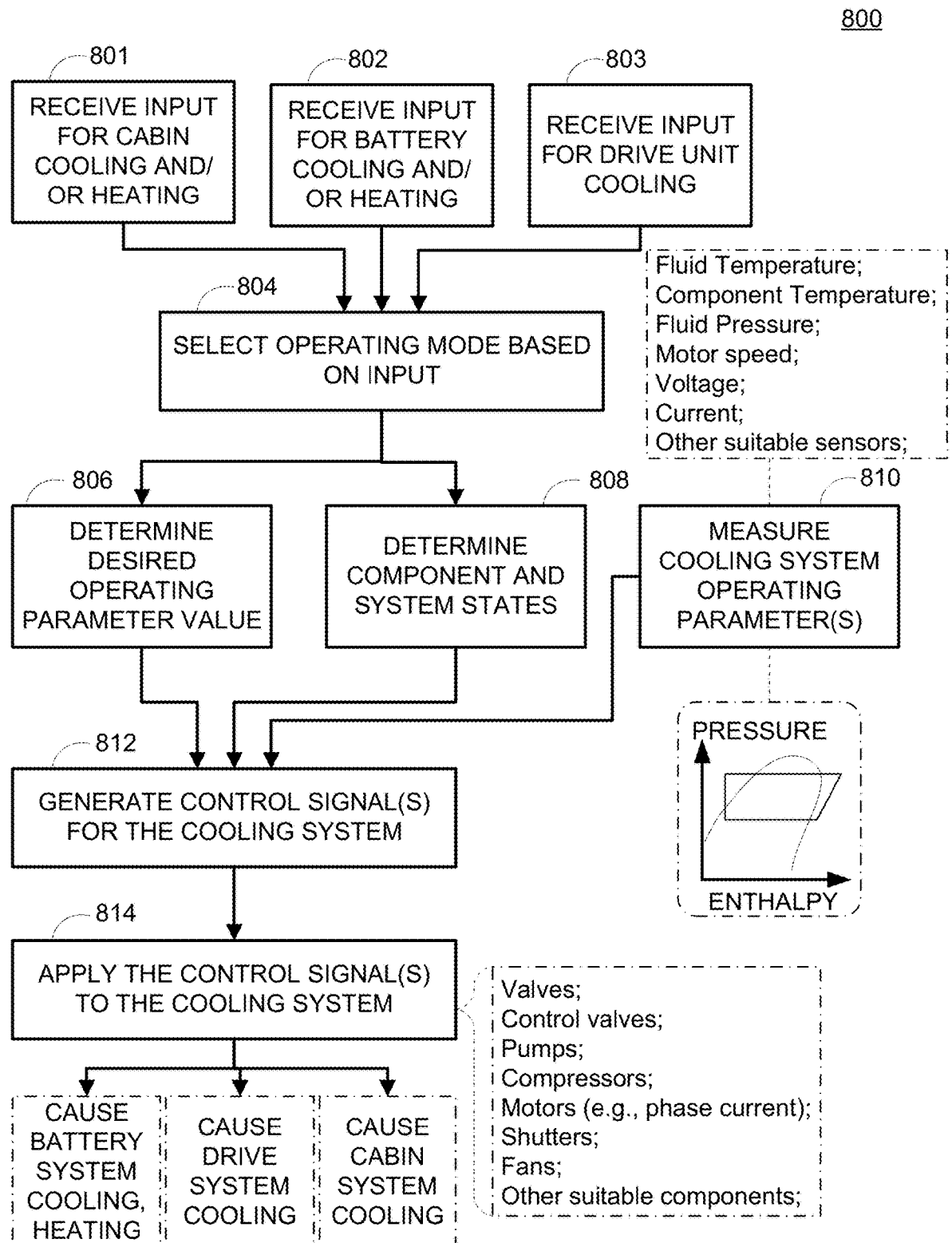
FIG. 8 is a flowchart of an illustrative process for thermally managing a, in accordance with some embodiments of the present disclosure.

FIG. 8 is a flowchart of illustrative process 800 for thermally managing a, in accordance with some embodiments of the present disclosure. To illustrate, the illustrative steps of process 800 may be performed by thermal architecture 200 of FIG. 2, vehicle 100 of FIG. 1 (e.g., a control system thereof), control circuitry 310 of FIG. 3 (and any suitable additional systems of FIG. 3 or otherwise).

Steps 801-803 include receiving a respective input for cabin cooling, battery cooling, drive unit cooling or a combination thereof. Input may be received from an interface (e.g., a user interface), another controller, another algorithm or set of instructions, a mobile device, memory (e.g., retrieved from memory), any other suitable source, or any combination thereof. For example, in some embodiments, the input is received from a user interface, a central controller, other control circuitry, or a combination thereof. In a further example, the cabin air cooling target may be selected by a vehicle occupant using a user interface, while the battery cooling target may be determined by control circuitry based on a temperature and/or heat load of the battery system. In some embodiments, the input includes a temperature setting (e.g., an air, coolant, refrigerant, or component temperature), a cooling setting (e.g., an amount of energy, power, or duty cycle), an indication of an operating mode (e.g., "low," "high," numerically indexed setting, or other predetermined discretization of operating), any other input type, or any combination thereof. In some embodiments, the system may receive more than one input such as, for example, a cabin air target, a battery cooling system target, and a drive system cooling target. In some embodiments, the system may generate a queue of inputs, ordered by priority, temporal succession (e.g., in order received), or a combination thereof. The system may be configured to receive inputs at a particular time or frequency, receive inputs as transmitted to the system, in response to an event, or a combination thereof. In some embodiments, the system need not perform steps 801-803 and may determine target values based on some other suitable criterion.

Step 804 includes selecting an operating mode (e.g., a cooling or heating mode). In some embodiments, selecting the cooling mode is based on the input of steps 801. In some embodiments, the system selects the cooling mode based on the cooling requirements at that instant. For example, if a desired battery temperature is greater than a current temperature of the batteries, then the system may select a heating mode to provide heat to the batteries to increase their operating temperature. In a further example, if a desired battery temperature is less than a current temperature of the batteries, then the system may select a cooling mode to remove heat from the batteries to decrease their operating temperature. In some embodiments, step 804 may include selection a mode from among a plurality of modes, such as from among a first mode and a second mode. It will be understood that modes may be designated as first and second (e.g., or any other suitable indexing), heating and cooling, default and auxiliary, or any other suitable designation, in accordance with the present disclosure. For example, first and second modes may refer to particular configurations of a system, indexed by a numeric identifier that may, but need not, imply or correspond to a hierarchy of the modes.

Step 806 includes determining a desired operating parameter value. In some embodiments, determining a desired operating parameter value is based on the input of steps 801-803, the operating mode of step 804, or a combination thereof. In some embodiments, the system may determine a desired operating parameter value (e.g., a target value) for each input that is received. In some embodiments, the system may determine a desired operating parameter value based on all inputs received. For example, the system may determine a target value (e.g., a target temperature, pressure, shaft speed, heat transfer amount, current, voltage) and control one or more components to balance temperature and the cooling power request(s).

Step 808 includes determining component and system states. In some embodiments, for example, the system may determine valve positions, values relative to a threshold, operating range identifiers, an on/off condition of one or more components, operating within one or more discrete operating regimes, any other suitable state, or any combination thereof.

Step 810 includes measuring an operating parameter of one or more subsystems. In some embodiments, the system senses one or more operating parameters for use as a feedback signal to a feedback controller, for generating a feedforward signal, or otherwise for generating a control signal. To illustrate, the system may use or more sensors (e.g., sensors 304 of FIG. 3) to sense pressure (e.g., a fluid pressure, suction pressure, or any other suitable pressure), temperature (e.g., a fluid temperature, ambient temperature, component temperature, or any other suitable temperature), a shaft speed (e.g., of a motor shaft, compressor shaft, or fan shaft), any other suitable parameter, or any combination thereof. The system may perform step 810 continuously, at a predetermined frequency, in response to an event, or a combination thereof, during the performance of other steps of process 800. For example, the system may monitor one or more sensor signals, and sample the one or more sensor signals for a feedback controller if the operating mode or control technique relies on a feedback signal. To illustrate, the system may receive a sensor signal (e.g., from sensors 304 of FIG. 3), and compare a value based on the sensor signal and a target value (e.g., a difference thereof) to determine a control signal.

Step 812 includes generating at least one control signal corresponding to one or more subsystems. In some embodiments, the system generates the control signal based on the desired operating parameter value determined at step 806. In some embodiments, the system may determine a compressor suction pressure target, target temperature (e.g., a fluid temperature, an evaporator temperature, a component temperature), target pressure, target cooling power, target shaft speed, target heating or cooling load, or a combination thereof at step 806, and then generate the control signal at step 812 based on the target value, a measured value, a reference value, any other suitable information, or any combination thereof (e.g., a difference between a target value and a measured value). At step 812, the system may generate an analog signal, a pulse width modulation signal, a pulse density modulation signal, a digital signal, a signal indicative of text or a message, any other suitable signal, or any combination thereof. For example, the system may generate any suitable control signal and transmit the control signal to a motor controller (e.g., motor power electronics). In a further example, the control signal may be indicative of a compressor speed target, a pump speed target, a valve position, a valve state, or any other suitable operating parameter or state. In some embodiments, the system applies a feedforward controller, a feedback controller, any other suitable controller, or a combination thereof. For example, the system may apply a feedforward controller based on one or more inputs, apply a feedback controller based on a measured value, or both, and generate the control signal based on both the feedforward controller and the feedback controller. To illustrate, the system may apply the feedforward controller to account for disturbances to either the cabin air system or the battery system, to avoid cycling the compressor on/off or causing the cabin air temperature to fluctuate, for example. The cabin air system, battery system, drive system, and refrigeration system may each have corresponding controllers that generate control signals at step 812.

Step 814 includes causing the control signal(s) of step 812 to be applied to one or more subsystems. In some embodiments, the system generates the control signal at step 812, and transmits the signal at step 814 to affect control of a subsystem. In some embodiments, for example, the system includes an I/O interface (e.g., I/O 316 of FIG. 3) for transmitting the control signal. In some embodiments, steps 812 and 814 may be combined, wherein the system may generate and apply the control signal as part of a single operation. The control signal may cause the battery system to be cooled or heated, the drive system to be cooled or to provide heat, or air provided by the cabin air system to be cooled, for example.

In an illustrative example, process 800 may be implemented by any of the systems disclosed herein. For example, the system may include a drivetrain cooling system for providing cooling to a drivetrain having at least one electric motor (e.g., drivetrain components 250 of FIG. 2, drive system 340 of FIG. 3, or drive system 420 of FIG. 4). The system may include a cabin air system (e.g., cabin air system 240 of FIG. 2, cabin air system 370 of FIG. 3, cabin air system 430 of FIG. 4) provides conditioned air to an occupant compartment. The system may include a battery system or subsystem thereof (e.g., battery system 230 of FIG. 2, battery cooling system 360 of FIG. 3, battery system 440 of FIG. 4) for providing thermal interaction with batteries of a battery system. The system may include a refrigeration system (e.g., refrigeration system 210 of FIG. 2, refrigeration system 320 of FIG. 3, suitable components of FIG. 4) for providing cooling to the cabin air system and to the battery system. The system may include control circuitry for selecting from among a first mode corresponding to heating the battery system, and a second mode corresponding to cooling the battery system (e.g., at step 804). The control circuitry may be configured to, in response to selecting the first mode, generate at least one control signal (e.g., at step 812) for controlling at least one control valve (e.g., of coolant system 220 of FIG. 2, coolant system 330 of FIG. 3, or suitable components of FIG. 4) to distribute a fluid flow to the battery cooling system (e.g., of battery system 230 of FIG. 2, battery cooling system 360 of FIG. 3, battery system 440 of FIG. 4) and the drive system (e.g., of coolant system 220 or drivetrain components 250 of FIG. 2, drive system 340 of FIG. 3, or drive system 420 of FIG. 4). The control circuitry may be configured to cause the drive system (e.g., drivetrain components 250 of FIG. 2, drive system 340 of FIG. 3, or drive system 420 of FIG. 4) to generate heat in the first mode (e.g., at step 814), wherein at least some of the heat is transferred to the battery system (e.g., battery system 230 of FIG. 2, battery cooling system 360 of FIG. 3, battery system 440 of FIG. 4) via the fluid flow (e.g., coolant flow). In some embodiments, the control circuitry (e.g., control circuitry 310 of FIG. 3) is further configured to, in response to selecting the second mode, generate at least one control signal (e.g., at step 812) for controlling at least one control valve (e.g., valve 434) to (a) direct the flow of fluid to the drive cooling system of a drive system and (b) isolate the battery system from the drive system. In some embodiments, the system (e.g., control circuitry 310 of FIG. 3 or other suitable control circuitry) is further configured to generate the heat by applying excess current to phases of the at least one electric motor of the drive system (e.g., drivetrain components 250 of FIG. 2, drive system 340 of FIG. 3, or drive system 420 of FIG. 4). To illustrate, the heat generated may be in excess of that normally generated without excess current (e.g., normal operation referring to motor control not configured to increase the amount of heat generated and thus includes applying lesser currents than with excess currents). To illustrate further, the drivetrain may include a plurality of electric motors (e.g., more than one electric motor such as two or four electric motors), having corresponding power electronics, and heat may be generated by each motor and power electronics. In some embodiments, having a plurality of motors, relatively more heat may be generated as compared to configurations having a single motor. For example, for drivetrains having a plurality of motors, there may exist the potential to generate relatively more heat as compared to a drivetrain having a single motor. In a further example, control circuitry (e.g., control circuitry 310 of FIG. 3) may be configured to generate one or more control signals (e.g., one control signal, more than one control signal, a plurality of control signals) for generating heat in one or more motors (e.g., of drive system 340 of FIG. 3). To illustrate, the control circuitry may generate four control signals to operate four motors (e.g., to generate heat in the four motors, to generate torque in the four motors). To illustrate further, heat from one motor, or more than one motor (e.g., two motors, three motors, four motors, or otherwise a plurality of motors), may be transferred to the fluid and to the battery system during heating.

In a further illustrative example, at steps 812 and 814 the system may generate and transmit one or more control signals to the at least one control valve (e.g., valve 434 and/or other suitable valves), which may include a three-way valve having an inlet corresponding to an outlet of a chiller interfaced to the battery system and alternate outlets corresponding to (i) a de-gas unit and (ii) an inlet of a pump of the battery system (e.g., as illustrated in FIGS. 6-7). In some embodiments, the system includes a check valve arranged between a de-gas unit and the battery system for limiting the fluid flow in one direction to the battery system from the de-gas unit.

In a further illustrative example, at steps 812 and 814 the system may generate and transmit a control signal to a shutter (e.g., shutter 481 of FIG. 4) configured to direct airflow through a radiator arranged downstream of the drive cooling system to affect heat transfer from the radiator (e.g., radiator 480 of FIG. 4). As airflow increases through the shutter, and across the radiator, the convective heat transfer coefficient will also increase. Accordingly, depending upon the relative values of the radiator temperature (e.g., based on the coolant temperature) and the air temperature, heat may flow to or from the air and the radiator. Opening the shutter more will generally increase heat transfer between the radiator and the air.

In a further illustrative example, in the second mode as selected at step 804, the coolant flow is directed from a de-gas unit (e.g., de-gas unit 432 of FIG. 4) to a pump (e.g., pump 427 of FIG. 4), from the pump to the drive system (e.g., pump 427 and drive system 420 of FIG. 4), from the drive system to a radiator (e.g., radiator 480 of FIG. 4), and from the radiator to back to the de-gas unit. In the second mode (e.g., illustrated in FIG. 6), the coolant flow through drive system 420 flows through radiator 480 and de-gas unit 432 in a loop (e.g., cooling path 499 of FIG. 6), while a chiller (e.g., chiller 455) cools the battery system (e.g., ESS 441) via a separate loop (e.g., cooling path 498 of FIG. 6) using the refrigeration system that is also capable of cooling the cabin (e.g., cabin air system 240 of FIG. 2, cabin air system 370 of FIG. 3, cabin air system 430 of FIG. 4). In the first mode (e.g., illustrated in FIG. 7) as selected at step 804, the fluid flow is directed from the de-gas unit to a first path corresponding to the battery system or cooling components thereof (e.g., of battery system 440 of FIG. 4) and to a second path corresponding to the drive system (e.g., drive system 420) and the radiator (e.g., radiator 480). In the first mode, the first path and the second path join before the inlet of the de-gas unit (e.g., de-gas unit 432 of FIG. 4) and then split after the de-gas unit (e.g., using valve 433, which may be a check valve).

In a further illustrative example, the system may include control circuitry configured to receive a plurality of sensor signals (e.g., at I/O 316 of FIG. 3) from sensors (e.g., sensors 304 of FIG. 3) positioned for capturing a maximum temperature before cooling with the radiator (e.g., radiator 480 of FIG. 4). The system, or control circuitry thereof, may be configured to determine a total heat based on the maximum temperature, which may be measured by sensors 304, which may include coolant T sensor of FIG. 5 arranged upstream of radiator 480. The system, or control circuitry thereof, may also be configured to control the radiator and/or a shutter to maintain a coolant temperature in a desired range based on the total heat. For example, the control circuitry may generate a control signal to open or close the shutter using a motor or other actuator. As the shutter opens or closes, the airflow through the radiator is increased or decreased, respectively.

In some embodiments, the system includes a two-way valve in-line with the RDUs (e.g., RDUs 425 and 426 of FIG. 4). In some embodiments, the system avoids a dedicated heater for the battery system (e.g., ESS 441), and rather uses a 3-way valve to provide (i) passive battery heating while driving, and (ii) active heating (e.g., during warm up or in cold weather) by sending requests to the motors for running with additional current to generate heat (e.g., up to 5KW, or more), which may be referred to herein as excess heat (e.g., in excess of heat generated in achieving a desired torque with a particular motor or motors). For example, under normal operation, the system need not generate excess heat and may be configured to minimize currents to minimize heating from losses. Further, current excess currents may be applied to generate additional heat compared to normal operation, without significantly affecting a motor torque. In some embodiments, as illustrated in FIG. 5, the system includes control circuitry and a positioning of sensors for (i) capturing a maximum temperature before cooling with the radiator at step 810, (ii) determining total heat at step 806 or 808, (iii) ensuring the radiator can reduce heat to maintain the coolant temperature in a desired range (e.g., using a control signal generated at step 812), and/or any other suitable system monitoring. For example, the system may use the position of sensors and valves, as well as using a single de-gas bottle (e.g., de-gas unit 432 of FIG. 4) to achieve improved cooling efficiency and a reduced cost and simplicity in design. To illustrate, the sensors (e.g., sensors 304 of FIG. 3, or sensors of FIG. 5) may be positioned to obtain readings for determining pressure and enthalpy (e.g., to indicate a fluid state on a P-H diagram) behaviors in the vehicle (e.g., to characterize the refrigeration system). In some embodiments, the system includes one or more evaporators and chillers, and at step 806 determines an amount of total heat that needs to be dissipated. For example, by focusing on efficiency to leverage the condenser, the sensors may be strategically positioned for each location and monitored at step 810.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
control circuitry configured to:
receive a plurality of sensor signals wherein the plurality of sensor signals comprise at least one sensor signal corresponding to a temperature;
select from among a first mode and a second mode, wherein the first mode corresponds to heating a battery system by transferring heat from a fluid to the battery system, and wherein the second mode corresponds to cooling the battery system;
in response to selecting the first mode, cause the heat to be generated by a drive system by applying excess current to at least one electric motor of a plurality of electric motors of the drive system, and
generate, based on the temperature, a control signal to control a valve configured to direct flow of the fluid from the drive system to the battery system to transfer the heat.

2. The system of claim 1, wherein the temperature is indicative of an inlet temperature of a radiator, and wherein the control circuitry is further configured to:
determine a total heat based on the temperature; and
control the radiator to maintain a fluid temperature of the fluid in a desired range based on the total heat.

3. The system of claim 1, wherein the valve comprises a three-way valve having an inlet corresponding to an outlet of a chiller interfaced to the battery system and alternate outlets corresponding to (i) a de-gas unit and (ii) an inlet of a pump of the battery system.

4. The system of claim 1, further comprising a check valve arranged between a de-gas unit and the battery system, the check valve configured to limit flow of the fluid in one direction to the battery system from the de-gas unit.

5. The system of claim 1, further comprising:
a radiator configured to cool the drive system; and
a chiller coupled to a refrigeration system configured to cool a cabin, wherein:
   the control circuitry is further configured to cause the heat to be generated by the drive system in a first configuration, and
   in a second configuration, the drive system is independently cooled by the radiator while the battery system is cooled by the chiller.

6. A method comprising:
selecting a mode that corresponds to heating a battery system;
in response to selecting the mode, causing a drive system to generate heat to be transferred to the battery system via a fluid by applying excess current to at least one electric motor of a plurality of electric motors of the drive system, wherein each of the plurality of electric motors drives a respective wheel of the drive system; and
in response to selecting the mode, controlling at least one control valve to distribute the fluid to the battery system and the drive system.

7. The method of claim 6, further comprising:
directing the fluid to flow from a de-gas unit to a first path corresponding to the battery system and to a second path corresponding to the drive system and a radiator, wherein the first path and the second path join upstream of an inlet of the de-gas unit.

8. The method of claim 6, further comprising controlling a shutter configured to direct airflow through a radiator arranged downstream of the drive system.

9. The method of claim 6, further comprising:
receiving at least one sensor signal from at least one temperature sensor;
determining a total heat based on the at least one sensor signal; and
controlling a radiator to maintain a temperature of the fluid in a desired range based on the total heat.

10. The method of claim 6, wherein the mode is a first mode, and wherein selecting the mode comprises selecting among the first mode that corresponds to heating the battery system and a second mode that corresponds to cooling the battery system.

11. The method of claim 10, further comprising, in response to selecting the second mode:
generating at least one control signal for controlling the at least one control valve to direct the fluid from a de-gas unit to a pump, from the pump to the drive system, from the drive system to a radiator, and from the radiator back to the de-gas unit;
cooling the drive system using the radiator; and
cooling the battery system using a chiller coupled to a refrigeration system that is also capable of cooling a cabin.

12. A system comprising:
a drivetrain comprising a plurality of electric motors, wherein each of the plurality of electric motors drives a respective wheel of the drive system;
a battery system; and
control circuitry configured to:
   determine a selection to heat the battery system,
   in response to the selection, cause the drive system to generate heat by applying excess current to the at least one electric motor of the plurality of electric motors, and
   generate at least one control signal for controlling at least one control valve to cause a fluid to transfer the heat to the battery system from the drive system.

13. The system of claim 12, wherein the at least one control valve comprises a three-way valve having an inlet corresponding to an outlet of a chiller interfaced to the battery system and alternate outlets corresponding to (i) a de-gas unit and (ii) an inlet of a pump of the battery system.

14. The system of claim 12, further comprising a check valve arranged between a de-gas unit and the battery system and configured to limit a flow of the fluid in one direction to the battery system from the de-gas unit.

15. The system of claim 12, further comprising a shutter configured to direct airflow through a radiator arranged downstream of the drive system, wherein the control circuitry is further configured to control opening and closing of the shutter.

16. The system of claim 12, wherein the control circuitry is further configured to determine the selection by selecting from among a first mode that corresponds to heating the battery system and a second mode that corresponds to cooling the battery system.

17. The system of claim 16, further comprising:
a cabin air system for providing conditioned air to an occupant compartment; and
a refrigeration system configured to provide cooling to the cabin air system and to the battery system, wherein, in the second mode:
   the drive system is configured to be independently cooled via a radiator, and
   the battery system is configured to be cooled via a chiller coupled to the refrigeration system.

* * * * *